May 25, 1937. H. E. PETERSON 2,081,305
SHEET METAL FASTENER
Filed April 3, 1936
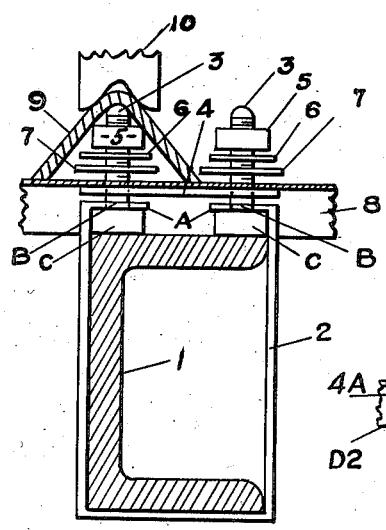
FIG. 1
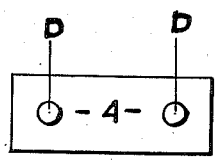
FIG. 2
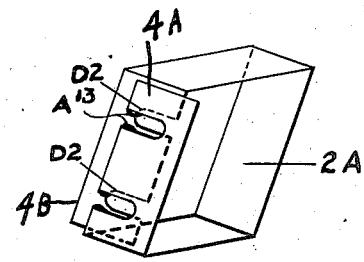
FIG. 3
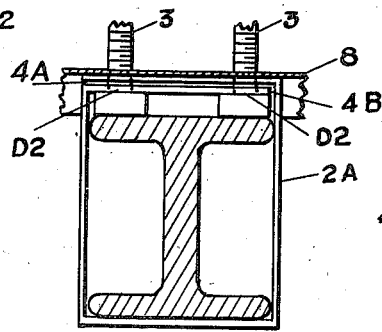
FIG. 4
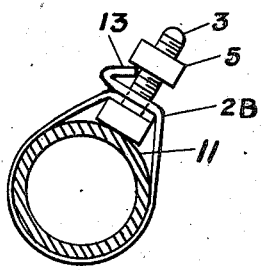
FIG. 6
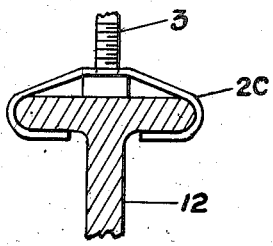
FIG. 7
FIG. 5
INVENTOR.
BY Harold E. Peterson
ATTORNEYS.

Patented May 25, 1937

2,081,305

UNITED STATES PATENT OFFICE 2,081,305

SHEET METAL FASTENER

Harold E. Peterson, Los Angeles, Calif.

Application April 3, 1936, Serial No. 72,579

9 Claims. (Cl. 189—35)

My invention relates particularly to sheathing for buildings, especially that class of buildings using sheet metal attached to metal framework, and my device is adapted to be used with either smooth or corrugated steel or any suitable material.

The principal object in my invention is to devise means for attaching bolts or rivets to framework of various shapes and holding said bolts and rivets to said framework in a suitable position to serve the purpose.

Another object in my invention is to provide means for preventing a threaded bolt from turning when a nut is being screwed into place to secure sheet material to a framework.

Another object in my invention is to provide means for spacing sheet metal or sheathing away from the framework to which said sheet metal or sheathing is attached.

Another object is to provide means to secure bolts and the like to a framework to prevent said bolts from tipping while sheathing is being applied over said bolts.

Another object is to provide packing means in combination with said bolts and sheathing whereby moisture will be excluded from holes perforated in the sheathing to pass bolts or the like through said sheathing.

A still further object is to provide means to house or streamline the exposed ends of bolts, rivets, or the like, in order to give the work a finished appearance when used for holding sheathing in place.

I attain these objects by the use of the devices described and illustrated herein, subject to such modification as will coincide with that which is claimed, and the form of my device may be changed within the scope of the claims.

Of the drawing:

Fig. 1 is a view of one form of my invention applied to a U-beam, shown in cross section, including a fragmentary portion of sheet metal partly in section and a soft metal bolt cap in section with a fragmentary portion of a swedging punch contacting said soft metal cap.

Fig. 2 is a plan view of a spreader washer.

Fig. 3 is a perspective of a modified form of spreader washer and frame band combined.

Fig. 4 is a cross section of an I-beam, with a view of combined band and spreader washer as of Fig. 3 applied, including a fragmentary portion of corrugated sheet metal partly in section.

Fig. 5 is a side view of a fragmentary portion of an I-beam surrounded by a band as of Figs. 1 or 2, including a fragmentary section of corrugated sheet metal.

Fig. 6 is a cross section of a tubular framework with a view of a metal band surrounding said framework and a bolt held in position by said head, illustrating a turned back end.

Fig. 7 is a fragmentary portion of a T-beam in section with a view of a bolt held in position by a sheet metal clamp.

Fig. 1 is a cross section of a channeled framework 1, surrounded by a sheet metal clevis or band 2 which may be made of any suitable gauge material, said band 2 having convergent ears as at A, provided with holes B—B to pass bolts 3 having square heads C, a spreader washer 4 having perforations at D—D adapted to slide over bolts 3. After band 2 has been shaped around channeled framework 1, the bolts 3—3 are passed through holes B—B in convergent ears A, and the perforations D—D in spreader washer 4, thus holding bolts 3—3 in proper spaced relationship to prevent tipping or turning, at the same time providing means to draw band 2 snugly around channeled framework 1 because of the relation of the spacing of perforations D—D with respect to holes B—B. The square head C—C of bolts 3—3 presents a flat surface against band 2 to prevent bolts 3—3 from turning when nuts 5—5 are tightened.

A hard metal friction washer 6 is preferably used adjacent to nut 5, and a lead washer 7 is inserted between the hard metal washer 6 and the sheathing material 8. Said sheathing material 8 if made of sheet metal is ordinarily applied over bolts 3—3 by laying the sheathing 8 against the end of bolts 3—3 and striking the material over the ends of said bolts 3—3 with a rubber hammer, thus causing said bolts 3—3 to penetrate the material 8. The lead washer 7 is then placed over the bolts 3 and a hard metal washer 6 is then placed between the nut 5 and the lead washer 7. The nut 5 is then tightened snugly into position against the shoulder formed by the square head C of the bolt 3. A soft metal cap 9 is then swedged over the bolt 3 with a swedging tool 10, forcing a soft metal material composing the cap 9 into the threads of bolts 3. Said cap 9 may be placed in position with cement or any other suitable material.

Fig. 2 is a plan view of spreader washer 4 showing perforations D—D.

Fig. 3 is a view in perspective of 2A, which is a modification of clevis or band 2, having oppositely disposed U-shaped slots D2, the equivalent of perforations D—D in spreader washer 4. 4A constitutes a modification of spreader washer 4 wherein the material at each side of the open end of said slots D2 terminates in tips A13 which are bent away from said slots D2 to admit the shanks of bolts 3. Said tips A13 when impinged by nut 5 are forced convergently around or against shanks of bolts 3 to lock said bolts 3 in a fixed position through the overlapping ends 4A and 4B, said overlapping ends serving the same purpose as spreader washer 4 and ears A.

Fig. 4 shows an I-beam in cross section surrounded by a band 2A, having one end 4A bent convergently to overlap the opposite end 4B of said band 2A. The slots D2 as of Fig. 3 being cut from opposite edges of the overlapping ends 4A and 4B. In order to attach this modification of the band 2A, it is necessary to spring said band in such a manner as to pass the bolts between the opposite sides of 4A and 4B, which will then be converged to surround bolt 3. Thus 4A and 4B have the equivalent effect of spreader washer 4 to hold bolts 3 in upright position and prevent them from turning. The open ends of the slots D2 are made with the entrance of said slots narrower in diameter than the diameter of bolts 3, so that when the convergent ends 4A and 4B of band 2A are overlapped to encompass bolts 3. The tips A13 are capable of being bent convergently to lock against the bolt 3 in a manner partly equivalent to the tip 13 of Fig. 6 wherein it will be noted that said tip 13 is bent convergently against the bolt 3 serving to lock the bolt in a fixed position when nut 5 is tightened to impinge said tip 13 against said bolt 3.

Fig. 5 is a view showing a fragment of framework 1 and a fragmentary portion of sheathing 8, the bolt 3 being held in position by band 2.

Fig. 6 shows a metal tubular frame 11 in cross section and the edge of a band 2B, which is the equivalent of band 2. The bolt 3 is passed through a round hole in one end of band 2B. The other end of band 2B has an oval perforation or slot long enough to allow said bolt 3 to be passed through band 2B. The tip end 13 is then turned back upon itself a sufficient distance to impinge the side of bolt 3 and tighten band 2B around tubular frame 11 when the nut is screwed down on the bolt. When the tip 13 is impinged by nut 5 it is drawn tightly against the shank of bolt 3; likewise, the two tips A13 at the open ends of slots D2 are forced downwardly to impinge the shank of bolts encompassed by said slots.

Fig. 7 shows a band 2C serving the same purpose as band 2, said band 2C being applied over the transverse portion of a T framework 12, shown in fragmentary cross section. The ends of band 2C are turned back underneath the transverse portion of T 12, and the angle formed by stretching the bands 2C between bolt 3 and the transverse portion of T 12, serves to impinge band 2C against the shoulder formed by the square head of bolt 3, thus holding bolt 3 in position and preventing bolt 3 from turning.

It will be noted that in all the figures of the drawing the shoulder formed at the conjuncture of the head and shank of bolt 3 serves to uphold the apex of a corrugation of sheathing 8. In case a thin, flat-headed bolt is used, a piece of tubing of suitable length may be placed over the shank of bolt 3 to act as a spacer to serve the same purpose as a square head C of bolt 3. If the bolt 3 has a circular head, one side of said bolt head may be ground flat to impinge band 2, or any equivalent thereof.

It is obvious that the band 2 may be formed to follow the contour of any framework to meet the contingencies of application and serve the purposes divulged by the disclosure hereof.

It will be noted that the clevis band 2 of Fig. 1 impinges the flat side of square head C of bolt 3, and the various modifications of the other figures of the drawing illustrate various means to prevent said square head C from turning when a nut is applied to bolt 3.

Having described my invention, and illustrated the structure thereof, it becomes evident that several new results have been attained.

First, as an example, the former method of attaching sheathing to a roof required one man underneath and one on top in order to apply the same. The present invention supplies means for holding attaching means in position for the application of sheathing without the necessity of using two men as recited above.

Second, the present invention provides an unusually efficient method for sealing overlapping joints of sheet metal, particularly corrugated sheet metal, because bolts or rivets can be tightened into position to an extent impractical with any other mode of fastening sheet metal or other sheathing into position.

Because of the new and novel features of my invention, and the improved structure thereof, together with the new results obtained, I claim, 1. In combination with a building framework, a band shaped around a portion of said framework, said band having perforations at the opposite ends thereof, a bolt having a nut thereon inserted through said perforations in said band, said band being drawn around said portion of said framework in a manner to impinge the head of said bolt against said framework between said band and said framework, when said nut is tightened against a piece of sheet metal to be held in position, and means to prevent said bolt from turning underneath said band, said means comprising a flat side of said head of said bolt for impingement against a corresponding flat side of said band.

2. A sheet metal fastener, comprising a band adapted to surround and conform with a framework member, said band formed of a strip of sheet metal perforated at both ends to receive a bolt shank through said band, a nut on said bolt, said bolt having a head adapted to be impinged between said band and said framework member, a portion of said band adapted to contact a flat surface on one side of said bolt head to prevent said head of said bolt from turning, an extended end of said band bent backward upon itself to impinge the shank of said bolt so that when the nut on said bolt is tightened against the turned back end of said band said band will be drawn tightly around said framework.

3. A sheet metal fastener, comprising a retaining band formed of a sheet metal strip perforated at opposite ends, said band having opposite ends convergently bent to hug a framework, a bolt passed through said perforations, said bolt having a head presenting a laterally disposed straight edge, said head adapted to be impinged between said band and said framework, and said band having a corresponding straight surface engaging said bolt head to hold said bolt perpendicular to the plane of said framework, and means to pull said band endwise by the thrust of a nut on said bolt.

4. A sheet metal fastener, comprising a band surrounding a framework, the terminal ends of said band perforated to receive bolts, said bolts inserted through said terminal ends of said band, the terminal ends of said band turned convergently toward one another, a spreader washer, perforations through said spreader washer to receive said bolts, said perforations being spaced so that when said spreader washer is applied over said bolts the convergent terminal ends of said band will be drawn toward one another to tighten said band around said framework and tightly impinge the head of said bolts against said framework.

5. A sheet metal fastener comprising a band to receive a framework, a bolt through the opposite ends of said band, said band having perforated overlapping ends to secure said bolt, said perforations consisting of transverse slots in relation to the width of said band, said slots having open ends disposed toward one another, said open ends providing means whereby the convergent ends of said band may be moved toward one another to cause said slots to surround said bolt, a nut on said bolt, said nut on said bolt adapted to impinge metal sheeting and the overlapping ends of said band to hold said band around said framework and draw said metal sheeting, said perforated overlapping ends of said band and said framework into impingement against one another.

6. A sheet metal fastener including in combination a clamping device comprising a metal band adapted to encompass and grip a frame member, said band having two convergent ends, nut and bolt elements connecting said convergent ends, said bolt elements standing substantially vertically away from the body composing said frame member, other elements disposed between said nut elements and the head of said bolt elements whereby the convergent ends of the said band will be urged together by said nut and bolt elements to hold said band snugly to said frame member and draw and hold the bolt elements snugly against said frame member to impinge said band against the head of said bolt elements to hold said bolt elements from turning when said nut elements are moved toward the head of said bolt elements.

7. A sheet metal fastener as of claim 6 including a soft metal cap capable of being swedged over the nut and bolt elements to seal said nut and bolt elements, and an opening around said bolt, against moisture passing around the shank of the bolt elements.

8. A sheet metal fastener comprising a clamping member having convergent ends held together by means comprising a bolt element, the head of said bolt element adapted for disposal against a frame member, the shank of said bolt element standing away from said frame member, a burr element for disposal on the shank of said bolt element to hold sheet metal between the burr and the head of said bolt element, tightening means between said bolt and burr elements to draw the convergent ends of said clamping member toward one another, and draw said clamping member firmly around said frame member to impinge the head of said bolt element against said frame member and draw said clamping member firmly around said frame member when said burr element is moved toward the head of said bolt element, said tightening means being held in position between said burr and said bolt head.

9. A sheet metal fastener as of claim 8, and including a cap of soft metal adapted to be swedged over the end of the bolt element and said burr element to shed moisture away from said bolt element and an opening in sheet metal held by the clamping device and member composed of said nut, burr and tightening element.

HAROLD E. PETERSON.